UNITED STATES PATENT OFFICE.

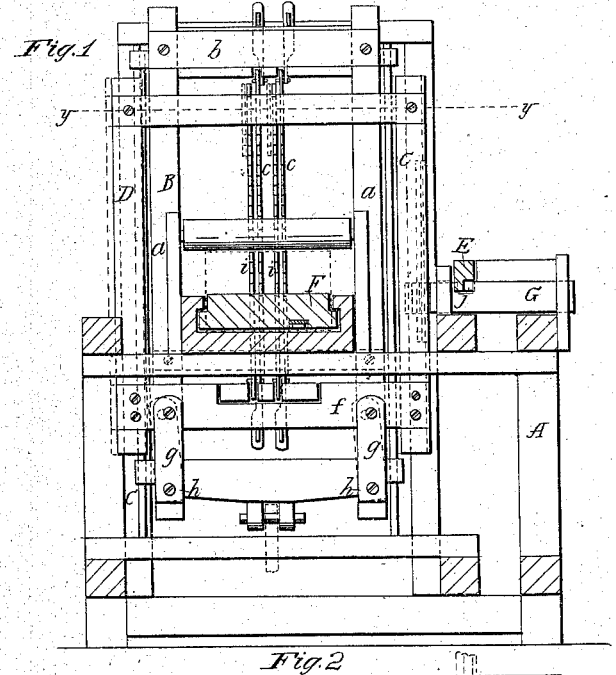

SHERMAN E. ANTHONY, OF STILLWATER, NEW YORK.

IMPROVEMENT IN SHINGLE-MACHINES.

Specification forming part of Letters Patent No. 35,288, dated May 20, 1862.

*To all whom it may concern:*

Be it known that I, SHERMAN E. ANTHONY, of Stillwater, in the county of Saratoga and State of New York, have invented a new and Improved Shingle-Machine; and I do hereby declare that the following is a full, clear, and exact description thereof, reference being had to the annexed drawings, making a part of this specification, in which—

Figure 1 is a vertical section of my invention, taken in the line $x\ x$, Fig. 2; Fig. 2, a horizontal section of the same, taken in the line $y\ y$, Fig. 1; Fig. 3, a detached inverted plan of a portion pertaining to the same; Fig. 4, a diagram showing the saw cuts or keys in the bolt.

Similar letters of reference indicate corresponding parts in the several figures.

This invention relates to an improved shingle-machine of that class in which saws are employed to perform the work.

The object of the invention is to obtain a machine by which the whole bolt may be sawed simultaneously into shingles of proper taper form; and to this end I employ two gangs of saws—one gang being placed in an ordinary reciprocating gate or frame, and the other gang placed in a gate or frame which has a lateral as well as a reciprocating movement, all being arranged substantially as hereinafter shown and described, whereby the desired result is attained.

To enable those skilled in the art to fully understand and construct my invention, I will proceed to describe it.

A represents a rectangular frame constructed in any proper way to support the working parts, and B is a saw-gate or sash, which is fitted on proper guides, C C, and allowed to work freely up and down thereon, said saw-gate being operated by the ordinary crank and pitman. The side pieces, $a\ a$, of the saw-gate B are connected at their upper and lower parts by cross-bars $b$, two bars $b$ being at each end; and on these bars the saws $c$ are strained, any proper number being used, according to the size of the bolts to be sawed.

D is a saw-gate which is connected to the gate B, the latter being within the former. The side pieces, $d\ d$, of the gate D are connected at their upper ends by two bars, $e\ e$, which fit in recesses in the side pieces, $a\ a$, of the gate B, and the lower cross-piece, $f$, of gate D is connected to the upper ends of arms $g$, the lower ends of which are secured by pivots $h$ to the lower end of the gate B. In the gate D saws $i$ are placed, the saws $c\ i$ of the two gates having alternate positions, but placed in line with each other.

The saw-gate D has a lateral movement allowed it, owing to the manner in which it is connected to the gate B; and said gate D also has the same reciprocating movement as the gate B.

The saws $c\ i$ are sufficient in number to cut the whole width of the bolt, although only four saws are shown in the drawings, two in each gate. The gate D may have its lateral movement given it by means of an oblique cleat, $j$, attached to the under side of a bar, E, which is connected to the bolt-carriage F, the cleat $j$ of bar E fitting in a recess which is made in a horizontal bar, G, attached to the gate D. The cleat $j$ of bar E is shown clearly in Fig. 3.

The operation is as follows: The bolt to be sawed (shown in red outline) is placed on the carriage F, and the latter is moved toward the saws in the usual or in any proper way, the two gates working up and down, as usual. As the carriage moves forward, the oblique cleat $j$ moves the gate D laterally, and the saws $i$, in consequence of this lateral movement, will saw the shingles in proper taper form. The cuts of the saws $c\ i$ are indicated by the lines $c'\ e'$ in Fig. 4. By this arrangement it will be seen that shingles may be very rapidly and perfectly sawed in proper taper form; and it will also be seen that there will be no waste timber, all being sawed into shingles, provided a sufficient number of saws are used to correspond with the width of the bolt.

Having thus described my invention, what I claim as new, and desire to secure by Letters Patent, is—

The arrangement of the saws $c\ i$, the reciprocating gate B, and the laterally-adjustable reciprocating gate D, with each other and with the bar E, cleat $j$, and carriage F, the whole constructed and operating in the manner herein shown and described.

S. E. ANTHONY.

Witnesses:
 HAMILTON HATHAWAY,
 M. G. HEWITT.